United States Patent Office 3,111,783
Patented Nov. 26, 1963

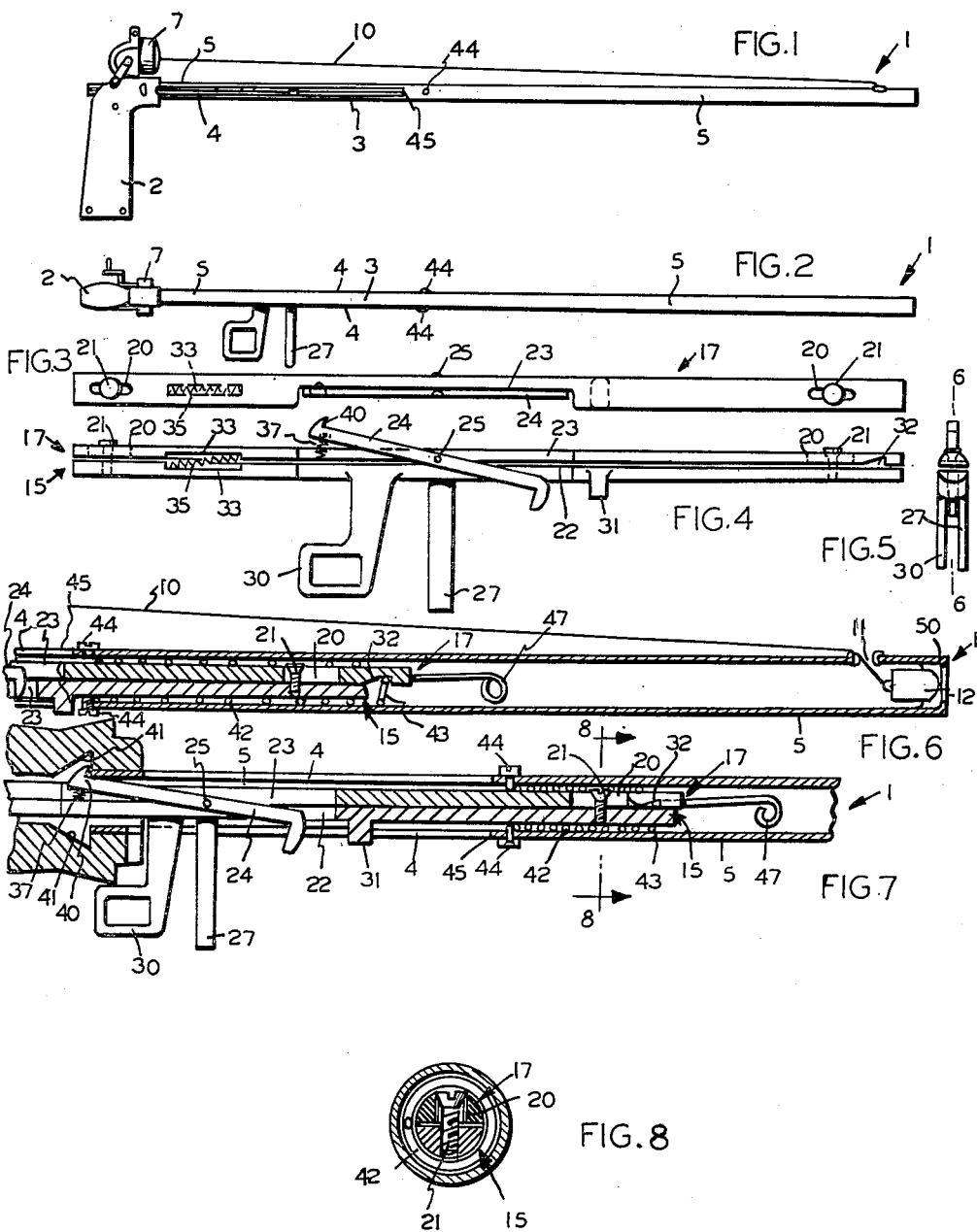

3,111,783
FISH LINE AND PLUG EJECTOR
George R. Dillin, Rte. 2, Box 5, Charlotte, Mich.
Filed Dec. 29, 1961, Ser. No. 163,227
2 Claims. (Cl. 43—19)

The present invention relates to improvements in fishing devices and, more specifically, to a new and improved ejector for a fish lure, a fishing line and a plug, or a small fish spear, or an arrow, or a dart, or a life line, or the like.

One object of the present invention is the provision of a device of the character described which is simple in construction and inexpensive to manufacture, and which does not require the customary swinging operation in order to cast a fish lure, a line and a plug or the like, thereby eliminating to a great extent the entangling of the line in bushes and overhanging limbs of trees when fishing along the side of a stream and the crossing of the line with the lines of other fishermen when fishing from a crowded boat.

Another object of the present invention is the provision of a device of the character described which is of a gun type that is pointed in the direction of the location where it is desired to cast a fish lure or the like, and by releasing a source of energy stored within the device, the fish lure or the like on a line unreeled from the device will be propelled with accuracy to the location selected and at a considerable distance of about one hundred forty-five feet or more.

A further object of the present invention is the provision of a device of the character described which has a novel spring arrangement for supplying power to actuate one element relative to another element of the device in conjunction with a novel trigger mechanism for compressing and releasing the spring power.

Still another object of the present invention is the provision of a device of the character described which is designed for ejecting fish lures in a simple and efficient manner, which can be readily used by fishermen to easily, quickly and efficiently eject their fish lures, which is attractive in appearance, light and compact to store, to carry and to operate, and which can be produced, packaged and mailed at a comparatively low cost, and can be conveniently assembled and utilized wherever desired or needed.

With the foregoing and other objects which will appear as the description proceeds, the invention consists of certain novel details of construction and combinations of parts hereinafter more fully described and pointed out in the claims, it being understood that changes may be made in the construction and arrangements of parts of the embodiment disclosed without departing from the spirit of the invention as claimed.

In the accompanying drawing I have set forth an illustrative embodiment of my invention.

In said drawing:

FIGURE 1 is a side view of a preferred embodiment of my invention;

FIG. 2 is a bottom view of the same;

FIG. 3 is an enlarged detailed side view of a spring actuating rod unit;

FIG. 4 is a bottom view of the unit of FIG. 3;

FIG. 5 is an end plan view of the unit of FIG. 3;

FIG. 6 is an enlarged fractional longitudinal sectional view on the line 6—6 of FIG. 5;

FIG. 7 is an enlarged fractional sectional view as FIG. 6 showing movable parts in positions which differ from the positions shown in FIG. 6; and FIG. 8 is an enlarged cross-sectional view on the line 8—8 of FIG. 7.

Similar reference characters refer to similar parts throughout the several views.

In the drawing the numeral 1 denotes a longitudinal tubular body, one end of which is secured to a preferably hollow handle 2 that may be shaped as a gun handle or the like. A portion 3 of the tubular body 1 is provided with longitudinal openings or slots 4, whereas a major portion 5 of the body 1 has uninterrupted wall sections and I prefer to call this portion 5 a "closed portion." The entire body 1 may be, for instance, sixty inches long and the slots 4 may be twenty inches long, and the body 1 is of a relatively small diameter, and is made preferably of steel.

A fishing reel or any other suitable winding mechanism 7, is mounted on the handle 2, and this mechanism 7 does not form a part of my present invention. A line 10 (FIGS. 1 and 6) extends from the mechanism 7 through an opening 11 (FIG. 6) into an outer free end section of the portion 5 of the body 1, and is connected to a fish lure 12 (FIG. 6), or the like, slidably inserted into the body 1 and intended to be ejected therefrom.

A pair of rods 15 and 17 of steel or the like are slidable relative to each other and are slidably mounted in the slotted portion 3 of the tube 1. The rods 15 and 17 preferably are semi-circular in cross-section and slide with their flat sides upon each other. The rod 17 is provided near each end with a slot 20 through which are extended a screw 21 that is screwed into the rod 15. The rods 15 and 17 have flattened or reduced portions 22 and 23 respectively, and a latch member 24 is pivoted at 25 to the portion 23 of the rod 17. A handle or a gripping portion 27 is laterally extended from the portion 23 of the rod 17, and a pulling member 30 is laterally extended from the portion 22 of the rod 15. A short lateral portion 31 is extended from the rod 15 near the portion 22 thereof, and a notch 32 is provided in the rod 17 close to the outer extremity thereof. Moreover, a pair of registering recesses 33 (FIGS. 3 and 4) are provided in adjacent portions of the rods 15 and 17, and a push spring 35 is diagonally mounted therein in such a manner that one end of the spring 35 engages the rod 15 while the other end of the spring 35 engages the rod 17. This spring 35 tends to slide the rods 15 and 17 into their substantially registering positions shown in FIGS. 3, 4 and 7. A small pressure spring 37 is interposed between the rod 17 and a hook-shaped end portion 40 of the latch member 24, tending to swing the member 24 in a clockwise direction on the pivot 25. A hollow portion of the handle is provided with an interior notch 41 adapted for receiving the hook-shaped portion 40 of the member 24.

A large pressure spring 42 is slidably inserted into the portion 5 of the tubular member 1, and has an irregularly shaped end portion 43 adapted for being lockably engaged by the notch 32 of the rod 17. A pair of screws 44, or any other suitably inwardly protruding elements are mounted on that section of the closed portion 5 of the body 1 which section is adjacent the open slotted portion 4 of the member 1, so as to limit the sliding movement of the spring 42 in the direction toward the handle 2. The spring 42 is so dimensioned that the unit formed by the rods 15 and 17 can be slid thereinto. Normally, the spring 42 is freely slidable in the portion 5 of the body 1 and is not connected in any manner to either one of the rods 15 or 17, so that a portion of the spring 42 may either protrude beyond the rods 15 and 17 or may be located in the empty space between the rod 15 and the fish lure 12.

For operating the device, after the fish lure 12 has been properly inserted thereinto, one grasps the handle portion 27 and pushes the same away from the handle 2, thus moving the rods 15 and 17 into the spring 42 and toward the fish lure 12, until the portion 31 hits the end 45 of the slot 4, in the body 1, thus stopping any further movement of the rod 15 in the aforementioned direction. In this position the rods 15 and 17 reach, and extend into, the spring 42 irrespective of how far the spring 42 has been moved toward the fish lure 12. However, a continued pressure on the handle portion 27 in the direction toward the fishing lure 12 will push the rod 17 a little further, thereby the rod 17 sliding on the rod 15 and its one end portion with the notch 32 protruding beyond the rod 15 (FIG. 6) until the screws 21, which extend from the rod 15 through the slots 20 in the rod 17, prevent any further movement of the rod 17 in the same direction. Thereby, a traverse section of the end portion 43 of the spring 42 snaps into the notch 32 for locking engagement with the rod 17, as may be seen in FIG. 6. Then the operator pulls the handle 27 back towards the handle 2, so that the spring portion 43 will be prevented by the rod 15 from leaving the notch 32, and that the spring 42 will be compressed between the screws 44 and the notch 32 of the rod 17, and the hook-shaped portion 40 of the member 24 snaps into the notch 41 in the hollow portion of the handle 2, as may be seen in FIG. 7. The notch 41 has a vertical portion against which now rests a substantially vertical section of the hook-shaped portion 40, and the notch 41 has also an oblique portion which is downwardly inclined from the upper end of the vertical section of the notch 41. The spring 37 will keep the portion 40 in the notch 41, and the spring 35 will keep the rod 15 in a substantially registering position with the rod 17, so that the portion 43 of the spring 42 cannot accidentally move out of the notch 32, but is locked safely therein between the rods 15 and 17. If one then pulls the pulling member 30 a little further in the direction toward the handle 2, the member 24 can swing easily in a counter-clockwise direction, so as to release its portion 40 from the notch 41, thus allowing the spring 42 to expand and to force the rods 15 and 17 toward the fish lure 12, until the element 31, hitting the end 45 of the slot 4, stops the rod 15, so that the rod 17 will move beyond the rod 15 sufficiently far for allowing the portion 43 of the spring 42 to slip out of the notch 32. The hook-shaped portion 40 of the member 24 has an oblique cam-shaped section (FIGS. 4 and 7), which—when sliding along the aforementioned oblique portion of the notch 41—will overcome the force of the spring 37 and will force the member 24 to carry out the above mentioned swinging in a counter-clockwise direction, which is required for releasing the rods 15 and 17. The shock caused by the element 31 hitting the end 45 of the slot 4, will cause the portion 43 of the spring to leave the notch 32, which then no longer is closed by the rod 15. This frees the spring 42, so that it can move further toward the fish lure 12 until the extremity 47 hits the fish lure 12 and ejects it from the tubular member 1. The considerable power of the spring 42—when released—moves the rods 15 and 17 rapidly toward the fish lure; thereby, the member 24, which is pivoted to the rod 17, moves at such a high speed by the notch 41 toward the fish lure that its portion 40 cannot engage the notch 41 in spite of the tension of the small spring 37. Thus the member 24 will not snap back fast enough for arresting the movement of the rod 17 toward the fish lure. An inwardly extending shoulder 50 (FIG. 6) at the free extremity of the member 1 will prevent the spring 42 from leaving the member 1.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A fish line and plug ejector comprising a tubular body adapted for having inserted thereinto an object and having a portion of which is provided with a longitudinal slot, a handle secured to the slotted portion of said body having a hollow portion provided with a notch, a first longitudinal member slidable in said body, having a stop portion extended through the slot in said body, a second longitudinal member slidable relative to said first longitudinal member being also slidable in said body and having a notched end portion, a gripping member extending from said second longitudinal member through the slot in said body, means for limiting the movement of said longitudinal members relatively to each other, resilient means interposed between said longitudinal members tending to align said longitudinal members to each other, a latch member pivoted to said second longitudinal member having a hook-shaped portion provided with an exterior cam section and adapted for engaging the notch in said handle, a pulling member extending from said first longitudinal member through the slot in said body, a spring interposed between said body and said longitudinal members having an end portion adapted for engaging the notch in said second longitudinal member and being longitudinally shiftable in said body, and means for limiting the movement of said spring toward said handle for allowing the spring to be compressed by moving said longitudinal members towards said handle until said latch member engages said notch in said handle; thereby the aforementioned end portion of said spring engaging the notch in said second longitudinal member, so that upon moving said pulling member farther toward said handle, the cam section on said latch member engages the notch in the hollow portion of said handle and causes a swinging of the latch member and a releasing thereof from said notch, which allows said spring to expand and to hit an object previously inserted into said body, so that said object will be ejected from said body.

2. A device of the character described comprising a tubular body a first portion of which is provided with a longitudinal slot and a second portion of which is adapted to for receiving an object to be projected therefrom, a handle from which the slotted portion of said body is extended having a latch-engaging portion, a pair of longitudinal members slidably connected to each other being slidable in said body and having lateral portions extending through the slot in said body as well as having spring engaging portions, a latch member mounted on one of said longitudinal members being adapted for engaging the latch-engaging portion of said handle and having a cam section, a spring slidable in said body and on said members having a traverse end portion adapted for engaging the spring engaging portions of said members, and means for limiting the movement of the spring toward said handle for allowing the spring to be compressed by moving said longitudinal members towards said handle until said latch engages said latch engaging portion, thereby the traverse end portion of said spring, engaging the spring-engaging portions of said longitudinal members, so that upon moving that one of said longitudinal members on which said latch member is mounted toward said handle, the cam section on said latch member engages a section of the hollow portion of said handle and causes a lateral swinging movement of said latch member and a releasing of the same from the latch-engaging portion of the handle, which releasing allows said spring to expand and to hit an object previously inserted into said body, and to eject the object from said body.

References Cited in the file of this patent

UNITED STATES PATENTS

| | | |
|---|---|---|
| 764,853 | Kimberlin | July 12, 1904 |
| 2,217,820 | Rowe | Oct. 15, 1940 |
| 2,875,548 | Stewart | Mar. 3, 1959 |